UNITED STATES PATENT OFFICE.

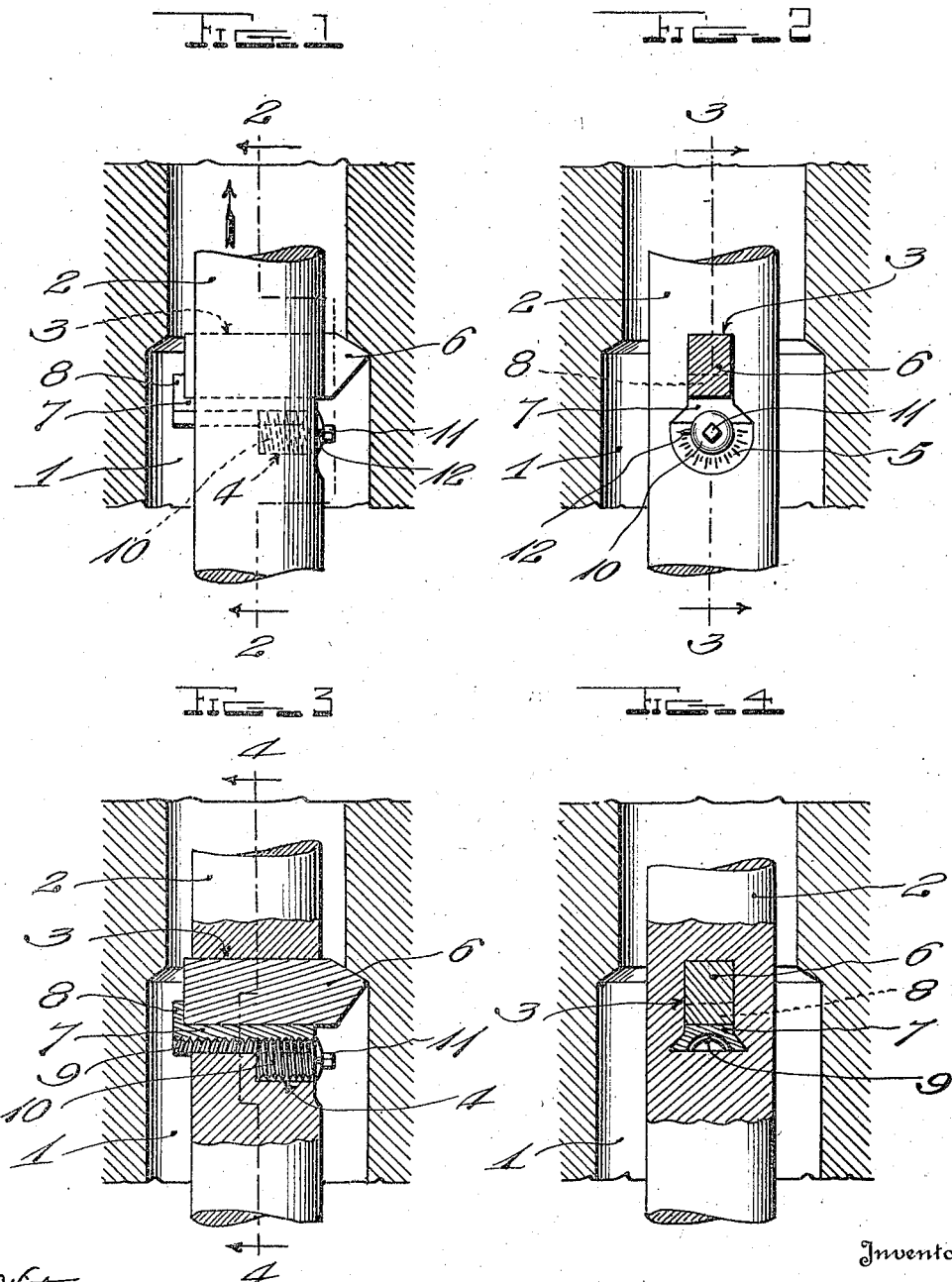

ADAM L. EWEN, OF NORTH SMITHFIELD, RHODE ISLAND.

TOOL-HOLDER.

1,237,185.   Specification of Letters Patent.   Patented Aug. 14, 1917.

Application filed December 30, 1916. Serial No. 139,847.

*To all whom it may concern:*

Be it known that I, ADAM L. EWEN, a citizen of the United States, residing at North Smithfield, in the county of Providence and State of Rhode Island, have invented new and useful Improvements in Tool-Holders, of which the following is a specification.

My present invention pertains to tool holders, and it consists in the peculiar and advantageous tool - holding construction, hereinafter described and claimed, designed more particularly for embodiment in the boring bars such as used in upright or horizontal boring machines.

In the accompanying drawings, which are hereby made a part hereof.

Figure 1 is an elevation illustrating a boring bar constructed in accordance with my invention as the same appears when in use.

Fig. 2 is a side elevation of the boring bar, with the cutting tool in section, taken at a right angle to Fig. 1, the section being on line 2—2 of Fig. 1.

Fig. 3 is a detail diametrical section, taken through and showing the relative arrangement of the tool support and feeding device, the bar, and the screw through the medium of which said support and feeding device is adjusted and adjustably fixed, the section being on line 3—3 of Fig. 2.

Fig. 4 is a section on line 4—4 of Fig. 3.

Similar numerals of reference designate corresponding parts in all of the views of the drawings.

1 in Fig. 1 indicates an opening in which my improved device is illustrated at work.

The bar 2 of the improved device is provided at 3 with a diametrically-disposed opening, and in communication with the lower portion of the said opening 3 and extending in the same direction as the same is a smooth groove 4, of semi-circular form in cross-section. On the face of the bar and adjacent to the outer end of the said smooth groove a graduated scale 5 is preferably, though not necessarily, provided as illustrated.

Arranged in the opening 3 and extending diametrically of the bar 2 is a cutting tool 6, and also arranged in the lower portion of the opening is the tool rest and feeder 7. It will be noticed here that the lower portion of the opening 3 is of dovetail form in cross-section as is also the tool rest and feeder 7. This, however, is merely a preferred form, and I would have it understood that the support and feeder 7 and the opening portion in which it is disposed may be of any other desired form in cross section without affecting my invention. At its rear end the tool rest and feeder is provided with a flange 8 which abuts against the rear end of the tool, and at its opposite side, with reference to the tool, the rest and feeder is provided with a threaded groove 9, of semicircular form in cross-section. This groove 9 is opposed to the groove 4 in the bar 2, and the two are adapted to receive the screw 10 which has for its function to adjust and adjustably fix the rest 7 and the tool 6 so as to properly hold the latter to its work. The said screw 10 has an angular protuberance 11 at its outer end or is otherwise adapted for the engagement of a turning device, and it is provided with a pointer 12, designed to coöperate with the before described scale 5. The said pointer 12 and scale 5 are employed in order to enable the operator to see the extent to which the cutting tool is adjusted, but it is obvious that they may be omitted in the discretion of the manufacturer of my improved device, without departure from the scope of my claims.

In the practical use of my novel construction, the cutting tool is held to its work and against retrograde movement by the rest 7, which in turn, is held by the screw 10 bearing in the bar 2. It will be manifest that the flange 8 on the rest 7 will preclude backward movement of the tool when a hard spot in the work is encountered; also, that by virtue of the screw connection intermediate the rest 7 and the bar 2, the tool may be quickly and accurately advanced to compensate for wear or may otherwise be adjusted and adjustably fixed.

The tool advances into the work in the direction indicated by arrow in Fig. 1, and hence it will be observed that the screw 10 may be turned about its axis to attain the adjustment desired without the necessity of removing the bar 2 from the work.

I would further have it understood that my improvements are susceptible of being arranged in the bar 2 at any point intermediate the ends of the said bar, as the character of different pieces of work requires.

It will be noted that incidental to the use of the holder the screw 10 will operate against the vertical wall of the groove and in the threaded part of the rest 7.

Having described my invention, what I claim and desire to secure by Letters Patent, is:

1. In a tool-holding construction, the combination of a bar having a diametrically-disposed opening and also having a smooth groove, of semicircular form in cross-section, communicating with and extending in the same direction as said opening, a tool rest and feeder having a flange at its rear end adapted to be opposed to the rear end of a tool and also having a threaded groove of semi-circular form in cross section opposed to the smooth groove in the bar, and a screw interposed between the bar and the tool rest and engaging the threaded portions of the tool rest and adapted to adjust and adjustably fix the latter.

2. In a tool-holding construction, the combination of a bar having a diametrically-disposed opening, and a groove, of semi-circular form in cross-section, communicating with and extending in the same direction as said opening and also having a graduated scale adjacent to the outer end of said groove; a tool rest and feeder having a flange at its rear end adapted to be opposed to the rear end of a tool and also having a threaded groove of semi-circular form in cross-section opposed to the groove in the bar, and a screw interposed between and engaging the threaded portion of the tool rest and feeder and having a pointer adapted to coöperate with the scale of the bar.

In testimony whereof I have hereunto set my hand in presence of two subscribing witnesses.

ADAM L. EWEN.

Witnesses:
 EDGAR L. SPAULDING,
 EVELYN W. SPAULDING.

Copies of this patent may be obtained for five cents each, by addressing the "Commissioner of Patents, Washington, D. C."